US010361830B2

United States Patent
Kim et al.

(10) Patent No.: US 10,361,830 B2
(45) Date of Patent: Jul. 23, 2019

(54) METHOD AND APPARATUS FOR DESIGNING UPLINK REFERENCE SIGNAL ACCORDING TO REPEATING PATTERN CONSIDERING CELL COVERAGE IN WIRELESS COMMUNICATION SYSTEM

(71) Applicant: LG ELECTRONICS INC., Seoul (KR)

(72) Inventors: Kitae Kim, Seoul (KR); Jiwon Kang, Seoul (KR); Kilbom Lee, Seoul (KR); Heejin Kim, Seoul (KR); Kungmin Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/571,601

(22) PCT Filed: May 17, 2016

(86) PCT No.: PCT/KR2016/005192
§ 371 (c)(1),
(2) Date: Nov. 3, 2017

(87) PCT Pub. No.: WO2016/186425
PCT Pub. Date: Nov. 24, 2016

(65) Prior Publication Data
US 2018/0145808 A1    May 24, 2018

Related U.S. Application Data

(60) Provisional application No. 62/162,819, filed on May 18, 2015.

(51) Int. Cl.
*H04W 72/08* (2009.01)
*H04L 5/00* (2006.01)
(Continued)

(52) U.S. Cl.
CPC ............. *H04L 5/0048* (2013.01); *H04B 7/04* (2013.01); *H04L 25/0224* (2013.01);
(Continued)

(58) Field of Classification Search
CPC ..... H04W 72/08; H04W 16/28; H04W 16/02; H04W 56/00; H04L 5/00; H04L 25/02
See application file for complete search history.

(56) References Cited

U.S. PATENT DOCUMENTS

2012/0039205 A1* 2/2012 Kogure ............... H04W 52/367
370/252
2013/0040684 A1* 2/2013 Yu ........................ H04B 7/0617
455/517
(Continued)

FOREIGN PATENT DOCUMENTS

KR  10-2011-0090805 A   8/2011
KR  10-2013-0018074 A   2/2013
WO  WO 2011/087291 A2   7/2011

OTHER PUBLICATIONS

Catt et al., "SRS configurations for TDD", R1-081777, 3GPP TSG RAN WG1 meeting #53, Kansas City, MO, USA, May 5-9, 2008, 6 pgs.

(Continued)

*Primary Examiner* — Chi Ho A Lee
(74) *Attorney, Agent, or Firm* — Birch, Stewart, Kolasch & Birch, LLP

(57) ABSTRACT

Provided are a method and an apparatus for transmitting an uplink reference signal in a wireless communication system. A terminal receives from a base station, information on the maximum repetition number of the uplink reference signal, determines the repetition number of the uplink reference signal using the received information on the maximum repetition number of the uplink reference signal and signal quality obtained through downlink synchronization, and
(Continued)

repeatedly transmits, to the base station, the uplink reference signal according to the determined repetition number of the uplink reference signal. The base station determines the uplink coverage of the terminal on the basis of the repeatedly received uplink reference signal.

15 Claims, 20 Drawing Sheets

(51) Int. Cl.
| | |
|---|---|
| *H04B 7/04* | (2017.01) |
| *H04L 25/02* | (2006.01) |
| *H04W 16/02* | (2009.01) |
| *H04W 16/28* | (2009.01) |
| *H04W 56/00* | (2009.01) |
| *H04B 7/0413* | (2017.01) |
| *H04W 88/02* | (2009.01) |
| *H04W 88/08* | (2009.01) |
| *H04B 7/06* | (2006.01) |

(52) U.S. Cl.
CPC ........... *H04W 16/02* (2013.01); *H04W 16/28* (2013.01); *H04W 56/001* (2013.01); *H04W 72/085* (2013.01); *H04B 7/0413* (2013.01); *H04B 7/0617* (2013.01); *H04B 7/0695* (2013.01); *H04L 5/0007* (2013.01); *H04W 88/02* (2013.01); *H04W 88/08* (2013.01)

(56) References Cited

U.S. PATENT DOCUMENTS

| | | | |
|---|---|---|---|
| 2013/0201941 A1* | 8/2013 | Classon | H04L 5/0048 370/329 |
| 2014/0198736 A1* | 7/2014 | Shukair | H04W 52/225 370/329 |
| 2015/0131636 A1* | 5/2015 | Tanaka | H04W 4/08 370/336 |
| 2015/0271686 A1* | 9/2015 | Jha | H04W 24/02 370/329 |
| 2015/0304867 A1* | 10/2015 | Aulin | H04B 7/024 370/252 |
| 2016/0021623 A1* | 1/2016 | Guo | H04W 52/247 370/329 |
| 2016/0212664 A1* | 7/2016 | Uemura | H04W 24/08 |
| 2017/0142749 A1* | 5/2017 | Kim | H04W 76/38 |
| 2017/0318554 A1* | 11/2017 | Kim | G01S 5/0236 |
| 2017/0359836 A1* | 12/2017 | Kato | H04W 74/08 |

OTHER PUBLICATIONS

LG Electronics, "Details on SR repetition and SRS transmission for MTC UE", R1-152705, 3GPP TSG RAN WG1 Meeting #81, Fukuoka, Japan, May 25-29, 2015, 4 pgs.

* cited by examiner

METHOD AND APPARATUS FOR DESIGNING UPLINK REFERENCE SIGNAL ACCORDING TO REPEATING PATTERN CONSIDERING CELL COVERAGE IN WIRELESS COMMUNICATION SYSTEM

CROSS REFERENCE TO RELATED APPLICATIONS

This application is the National Phase of PCT International Application No. PCT/KR2016/005192, filed on May 17, 2016, which claims priority under 35 U.S.C. 119(e) to U.S. Provisional Application No. 62/162,819, filed on May 18, 2015, all of which are hereby expressly incorporated by reference into the present application.

BACKGROUND OF THE INVENTION

Field of the Invention

The present invention relates to wireless communication, and more particularly, to a method and an apparatus for designing an uplink reference signal according to a repeating pattern considering cell coverage in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

As a way to improve the efficiency of limited resources, so-called multi-antenna technology is being actively developed which achieves diversity gain by putting multiple antennas on the transmitter and receiver to cover more spatial regions for resource utilization, and which increases transmission capacity by transmitting data in parallel through each antenna. Multi-antenna technology may employ beamforming and/or precoding to improve signal-to-noise ratio (SNR). In closed-loop systems that can use feedback information at the transmitting end, beamforming and/or precoding may be used to maximize SNR through such feedback information. Beamforming is broadly classified into analog beamforming and digital beamforming.

Massive multiple-input multiple-output (MIMO) is a multi-antenna technology in which tens of antennas or even more, which is a lot more than now, are put into a base station to achieve higher data rates and higher energy efficiency. When conventional analog beamforming and/or digital beamforming is directly used in massive MIMO, signal processing and/or hardware implementation can get very complex, or the performance increase through the use of multiple antennas is only slight and the flexibility of resource allocation may be reduced. Consequently, the use of hybrid beamforming, a combination of conventional analog and digital beamforming, in massive MIMO is under discussion.

Recently, due to the rapid spread of mobile smart devices and the emergence of big data, mobile traffic is expected to be doubled every year and increased more than 1000 times in 10 years. The burden of mobile network operators have been increased due to the explosion of mobile traffic, and existing 4G mobile communication systems with limited additional frequency coverage cannot accommodate the explosive mobile traffic. Therefore, the development of 5th generation mobile communication technology based on millimeter wave (mm Wave) capable of securing broadband is being discussed. The millimeter wave is a frequency band of 30-300 GHz which is generally called extremely high frequency (EHF) band and has its wavelength of 1 cm to 1 mm. The wave with the wavelength is in the middle of the currently used radio frequency band and the infrared ray (its wavelength about 0.1 mm), and it is very close to the light and is used in high resolution radar and microwave spectroscopy. The millimeter wave has less diffraction properties and larger directive properties than the conventional communication wave, and has larger diffraction properties, and less directive properties than the laser beam. When millimeter waves are used for communication, it is considered that ultra-multiple communications is possible in that far exceeds the microwave communication capacity, but there is large transmission loss in the spatial transmission. This is because the energy absorption by the oxygen and water molecules in the atmosphere is relatively large compared to the existing cellular frequency, resulting in high path loss.

Since hybrid beamforming basically operates on the basis of a beam scanning operation, the base station needs to stably receive an uplink reference signal for beam estimation and channel estimation. As a result, a new method for designing the uplink reference signal may be considered.

SUMMARY OF THE INVENTION

The present invention provides a method and an apparatus for designing an uplink reference signal according to a repeating pattern considering cell coverage in a wireless communication system. The present invention provides a method for designing an uplink reference signal for efficient channel estimation when operating a massive multiple-input multiple-output (MIMO) transceiver end. The present invention provides a method for designing an uplink reference signal, which allows a base station to easily perform cell division for each user equipment (UE) based on a repeating pattern based uplink reference signal transmitted by a UE.

In an aspect, a method for transmitting an uplink reference signal by a user equipment (UE) in a wireless communication system is provided. The method includes receiving, from a base station, information on a maximum repetition number of the uplink reference signal, determining a repetition number of the uplink reference signal by using the received information on the maximum repetition number of the uplink reference signal and signal quality obtained through downlink synchronization, and repeatedly transmitting, to the base station, the uplink reference signal according to the determined repetition number of the uplink reference signal.

In another aspect, a method for determining uplink coverage of a user equipment (UE) by a base station in a wireless communication system is provided. The method includes transmitting, to the UE, information on a maximum repetition number of an uplink reference signal, repeatedly receiving the uplink reference signal from the UE according to a repetition number of the uplink reference signal, which is determined by the UE, and determining the uplink coverage of the UE based on the repeatedly received uplink reference signal.

A base station can stably receive an uplink reference signal and perform efficient channel estimation and cell division based on the received uplink reference signal.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
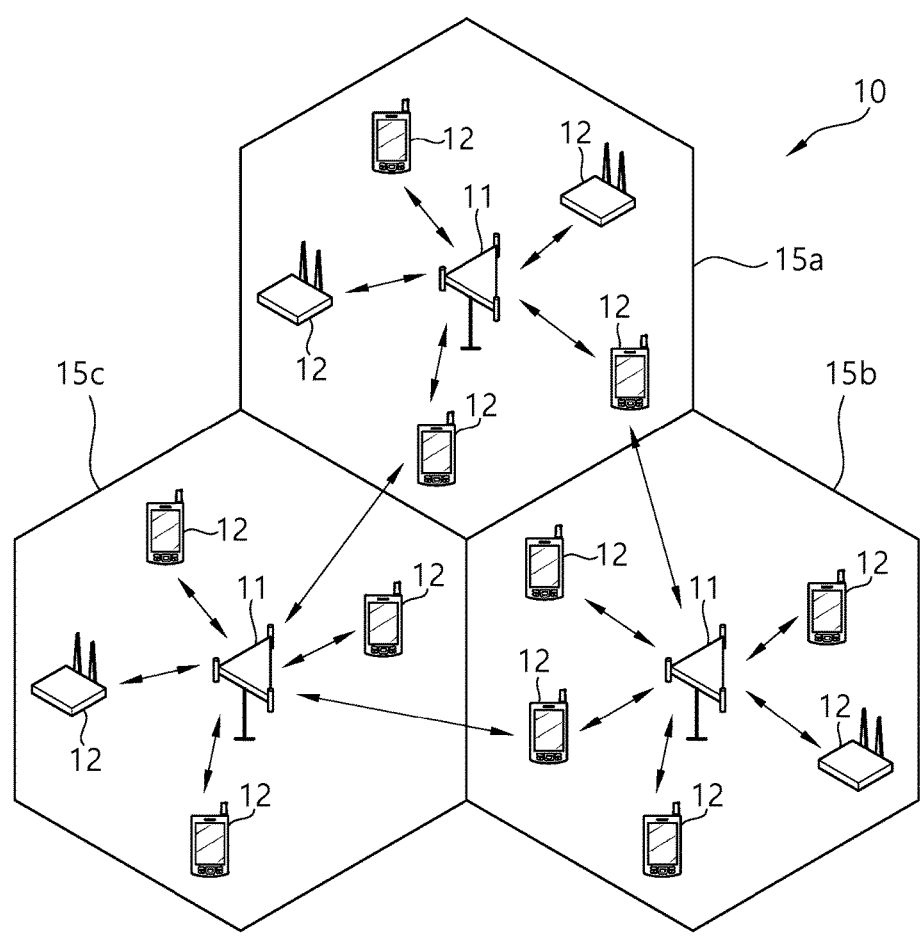
FIG. 1 shows a cellular system.

FIG. 1 shows a cellular system. Referring to FIG. 1, the cellular system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The BS 11 generally refers to a fixed station that communicates with the UE 12 and may be called by other names such as evolved-NodeB (eNB), base transceiver system (BTS), access point (AP), etc.

In general, a UE belongs to one cell, and the cell to which a UE belongs is called a serving cell. A BS providing a communication service to the serving cell is called a serving BS. The cellular system includes a different cell adjacent to the serving cell. The different cell adjacent to the serving cell is called a neighbor cell. A BS providing a communication service to the neighbor cell is called a neighbor BS. The serving cell and the neighbor cell are relatively determined based on a UE.

This technique can be used for downlink (DL) or uplink (UL). In general, DL refers to communication from the BS 11 to the UE 12, and UL refers to communication from the UE 12 to the BS 11. In DL, a transmitter may be part of the BS 11 and a receiver may be part of the UE 12. In UL, a transmitter may be part of the UE 12 and a receiver may be part of the BS 11.

Figure 2:
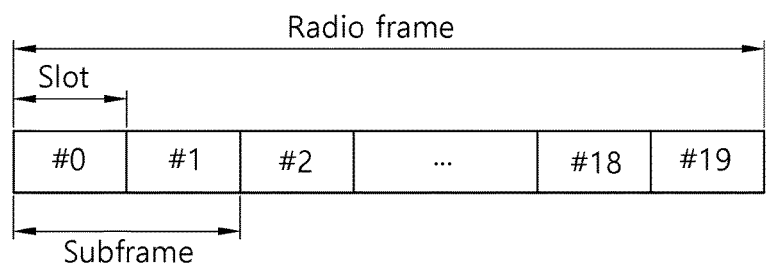
FIG. 2 shows a structure of a radio frame of 3GPP LTE.

FIG. 2 shows a structure of a radio frame of 3GPP LTE. Referring to FIG. 2, a radio frame consists of 10 subframes, and a subframe consists of two slots. Slots within the radio frame are numbered from #0 to #19. A transmission time interval (TTI) is a basic scheduling unit for data transmission. In 3GPP LTE, one TTI may be equal to the time it takes for one subframe to be transmitted. One radio frame may have a length of 10 ms, one subframe may have a length of 1 ms, and one slot may have a length of 0.5 ms.

One slot includes a plurality of orthogonal frequency division multiplexing (OFDM) symbols in time domain and a plurality of subcarriers in frequency domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners. 3GPP LTE defines one slot as 7 OFDM symbols in a normal cyclic prefix (CP) and one slot as 6 OFDM symbols in an extended CP.

When a UE is powered on or newly enters a cell, the UE may perform a cell search procedure such as acquiring time and frequency synchronization with the cell and detecting a physical cell identity (PCI) of the cell. To this end, the UE may receive a synchronization signal from the base station, synchronize with the base station, and obtain information such as a cell identifier or the like. The synchronization signal may include a primary synchronization signal (PSS) and a secondary synchronization signal (SSS).

The need for hybrid beamforming will be described. Beamforming technology using multiple antennas may be broadly divided into analog beamforming technology (hereinafter, "analog beamforming") and digital beamforming technology (hereinafter, "digital beamforming") depending on where a beamforming weight vector (or precoding vector) is applied.

Figure 3:
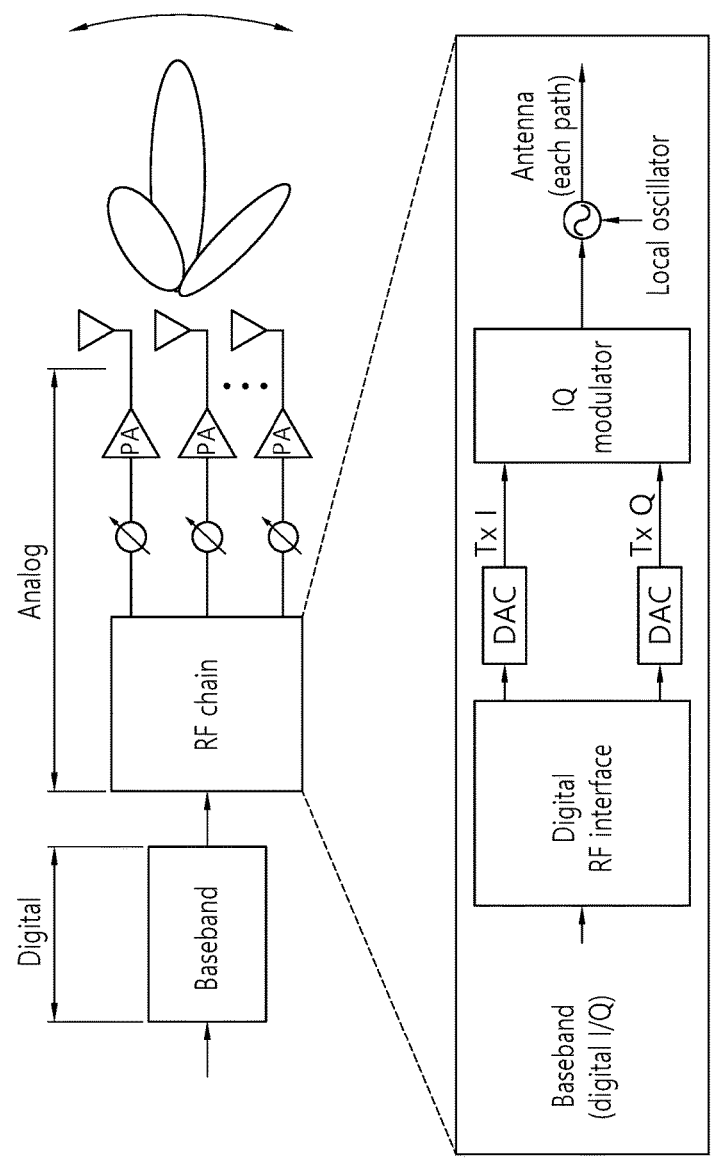
FIG. 3 is a block diagram of a transmitter including an analog beamformer and a radio frequency (RF) chain.

FIG. 3 is a block diagram of a transmitter including an analog beamformer and a radio frequency (RF) chain. Analog beamforming is a typical beamforming technique applied to earlier multi-antenna structures. In analog beamforming, a beam is formed by partitioning an analog signal, produced by digital signal processing, into a plurality of paths and configuring the phase shift (PS) and power amplifier (PA) settings for each path. Referring to FIG. 3, an analog signal derived from a single digital signal is processed by the PS and PA connected to each antenna. That is, the PS and the PA handles complex weights in the analog stage. Here, the RF chain refers to a processing block that converts a baseband signal into an analog signal. In analog beamforming, beam precision is determined by the element characteristics of the PS and PA, and the control characteristics of the element make analog beamforming advantageous for narrowband transmission. Moreover, the hardware structure makes it difficult to implement multi-stream transmission, thus making the multiplexing gain for higher data rates relatively small and making it impractical to form a beam per user based on orthogonal resource allocation.

Figure 4:
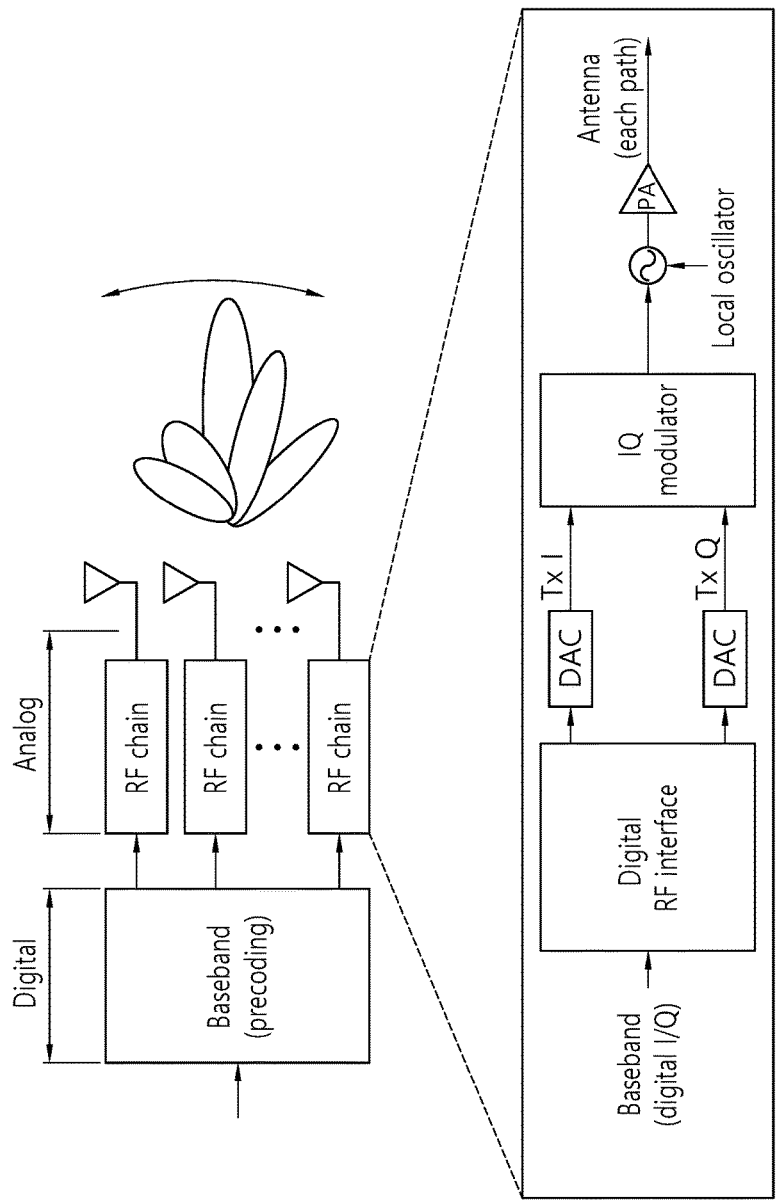
FIG. 4 is a block diagram of a transmitter including a digital beamformer and a RF chain.

FIG. 4 is a block diagram of a transmitter including a digital beamformer and a RF chain. In digital beamforming, as opposed to analog beamforming, a beam is formed in the digital stage by a baseband process, in order to maximize diversity and multiplexing gain in an MIMO environment. Referring to FIG. 4, a beam may be formed by performing precoding in the baseband process. The RF chains may include PAs. Hence, complex weights generated for beamforming may be applied directly to transmitted data. Digital beamforming may support simultaneous multi-user beamforming because a different beam may be formed for each user. Moreover, digital beamforming allows for forming an independent beam for each user to whom a resource is orthogonally allocated, thus providing high scheduling flexibility and enabling to operate the transmitting end according to a system purpose. In digital beamforming, when a technology such as MIMO-OFDM is used in a broadband transmission environment, an independent beam may be formed per subcarrier. Thus, digital beamforming may optimize the maximum data rate of a single user on the basis of increased system capacity and greater beam gain. Therefore, digital beamforming-based MIMO technology was adopted to 3G/4G systems.

Meanwhile, a massive MIMO environment with a significantly increased number of transmit-receive antennas may be considered. For a typical cellular system, it is assumed that up to 8 transmit-receive antennas are used in an MIMO environment, whereas scores or even hundreds of transmit-receive antennas may be used in a massive MIMO environment. When conventional digital beamforming is used in a massive MIMO environment, digital signal processing should be performed for hundreds of transmit antennas by a baseband process. This increases the complexity of signal processing considerably, and also increases the complexity of hardware implementation considerably since as many RF chains are needed as there are transmit antennas. Moreover, independent channel estimation is needed for every transmit antenna, and a frequency division duplex (FDD) system requires feedback information for massive MIMO channels of all antennas, thus considerably increasing pilot and feedback overhead. In contrast, when conventional analog beamforming is used in a massive MIMO environment, the hardware complexity at the transmitting end is relatively low, but the performance increase through the use of multiple antennas is only slight and the flexibility of resource allocation may be reduced. Especially in broadband transmission, it is very hard to perform beam control for each frequency.

Accordingly, massive MIMO environments require hybrid beamforming, a combination of analog beamforming and digital beamforming, rather than using either analog beamforming or digital beamforming as a beamforming technology. That is, a hybrid-type transmitting end structure may be needed so as to lower the complexity of hardware implementation at the transmitting end according to the characteristics of analog beamforming and to maximize beamforming gain using a large number of transmit antennas according to the characteristics of digital beamforming.

Hybrid beamforming will be described. As described above, the purpose of hybrid beamforming is to configure a transmitting end that provides the benefits of analog beamforming and the benefits of digital beamforming in a massive MIMO environment.

Figure 5:
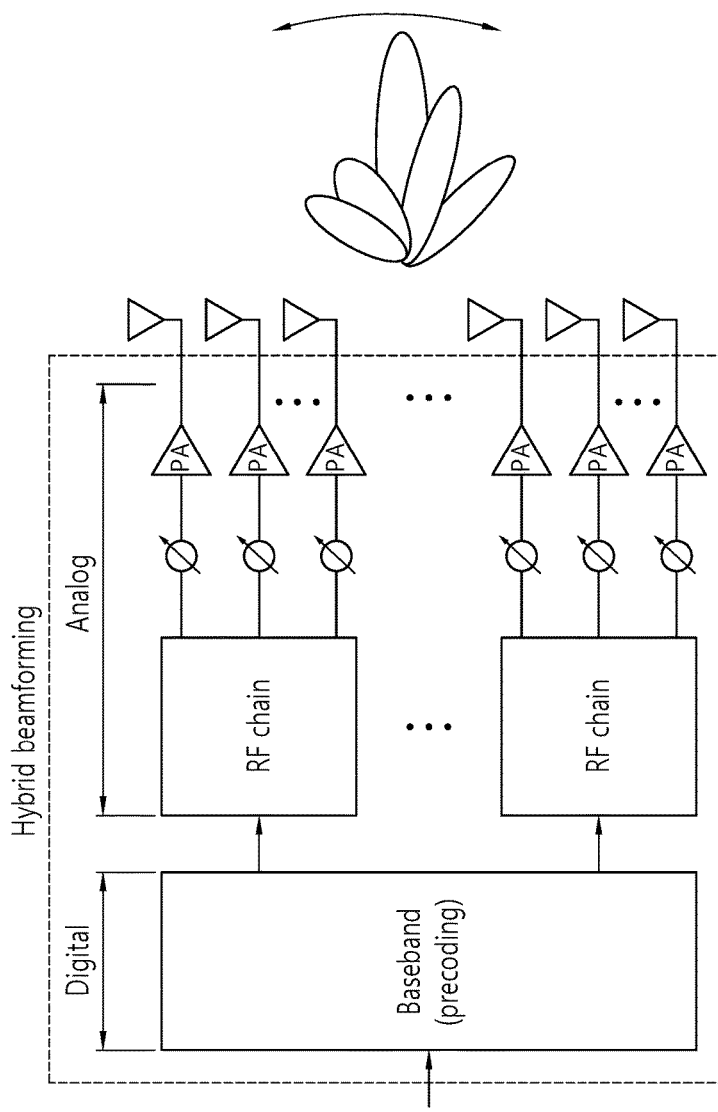
FIG. 5 is a block diagram of a transmitter including a hybrid beamformer.

FIG. 5 is a block diagram of a transmitter including a hybrid beamformer. Referring to FIG. 5, hybrid beamforming may basically allow for forming a coarse beam through analog beamforming and then a beam for multi-stream or multi-user transmission through digital beamforming. That is, hybrid beamforming exploits both analog beamforming and digital beamforming in order to lower the complexity of implementation at the transmitting end or hardware complexity.

Technical issues with hybrid beamforming are as follows.

(1) Difficulties in optimizing analog/digital beamforming designs: While digital beamforming allows for forming individual beams for different users using the same time-frequency resource, analog beamforming is limited in that a common beam has to be formed using the same time-frequency resource. This limitation may cause issues like a limit on the largest possible number of ranks corresponding to the number of RF chains, the difficulty of subband beam control using an RF beamformer, and/or the difficulty of optimization of beamforming resolution/granularity.

(2) Need for a specific method of common signal transmission: In analog beamforming, which forms a beam only in a particular direction on the same time-frequency resource, it is not possible to form multiple beams simultaneously in the directions of all UEs. Thus, DL/UL control channels, reference signals, broadcast channels, synchronization signals, etc., may not be transmitted simultaneously to all UEs that may be distributed over all areas in a cell. There are also problems which occur when a UE transmits physical random access channel (PRACH), physical uplink control channel (PUCCH), and/or sounding RS (SRS) over UL.

(3) Need for the design of more pilots and feedback to determine an analog/digital beam: In the case of estimation for analog/digital beams, the digital beam may be estimated directly by using a conventional orthogonal pilot allocation scheme, whereas the analog beam requires as long a time-duration as the number of beam candidates. This means that the more time delay is needed for analog beam estimation, and this may cause a system loss. Moreover, simultaneously estimating both digital and analog beams may lead to a considerable increase in complexity.

(4) Difficulties in supporting analog beam-based spatial division multiple access (SDMA) and FDMA: Digital beamforming allows to freely form beams for multi-users/streams, whereas, in analog beamforming, the same beam is formed for the entire transmission band, making it difficult to form an independent beam per user or per stream. In particular, it is hard to support FDMA (e.g. OFDMA) through orthogonal frequency resource allocation, thus making the optimization of frequency resource efficiency impractical.

Among the technical issues of the hybrid beamforming described above, the present invention described below can provide a method for optimizing the analog/digital beam design for the hybrid beamforming.

Hereinafter, a method for designing an uplink reference signal according to a repeating pattern considering cell coverage is proposed according to an embodiment of the present invention so that the base station may stably receive the uplink reference signal transmitted by the UE. According to an embodiment of the present invention, a method of repeated transmission and detection of the uplink reference signal considering the UE and the base station may be proposed. Utilization of the proposed method may be maximized particularly in a millimeter wave (mmWave) band.

(1) First, according to an embodiment of the present invention, the UE may transmit the uplink reference signal to the base station repeatedly M times. The base station may signal to the UE the maximum repetition number N of the uplink reference signal based on uplink service coverage of the cell. The maximum repetition number N of the uplink reference signal may be transmitted to the UE through system information. The repetition number M of the uplink reference signal may be equal to the maximum repetition number N of the uplink reference signal transmitted by the base station. That is, the UE may repeatedly transmit the uplink reference signal according to the maximum repetition number of the uplink reference signal transmitted by the base station.

Figure 6:
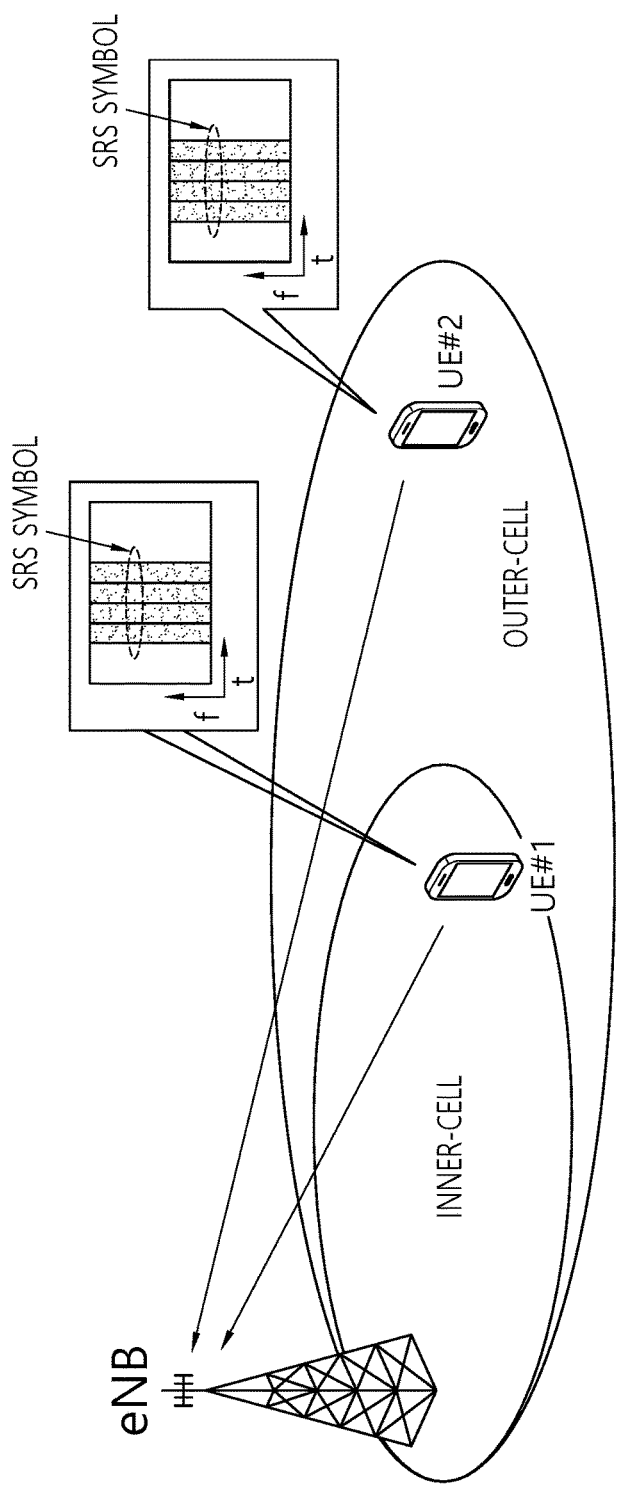
FIG. 6 illustrates an example in which each UE repeatedly transmits an uplink reference signal according to an embodiment of the present invention.

FIG. 6 illustrates an example in which each UE repeatedly transmits an uplink reference signal according to an embodiment of the present invention. Referring to FIG. 6, UE #1 is positioned in an inner-cell of the coverage of the cell provided by the base station and UE #2 is positioned in an outer-cell of the coverage of the cell provided by the base station. Each UE may repeatedly transmit the uplink reference signal (for example, SRS) M times according to information signaled by the base station. In the embodiment of FIG. 6, each of UE #1 and UE #2 repeatedly transmits the uplink reference signal four times. Domains (i.e. time-frequency domains) in which respective UE transmits the uplink reference signal may be separated from each other or may be multiplexed. Repeated transmission of the uplink reference signal may be commonly configured for a plurality of UEs or each UE may configure the repeated transmission of the uplink reference signal independently. For example, each UE may arbitrarily determine the repeated transmission of the uplink reference signal based on a signal to noise ratio (SNR), a reference signal received power (RSRP), a signal to interference and noise ratio (SINR), a reference signal received quality (RSRQ), or a received signal strength indication (RSSI) obtained during preferentially detecting downlink synchronization.

Table 1 shows an example of flexibly configuring the repetition number of the uplink reference signal for each UE. The base station may broadcast information shown in Table 1 to the plurality of UEs through the system information. Each UE may configure the repetition number of the UL reference signal according to Table 1 based on the SNR, RSRP, SINR, RSRQ, RSSI, and the like obtained during detecting the downlink synchronization. As a result, stable uplink reference signal coverage may be ensured and active control of reference signal resources may be achieved.

TABLE 1

| Signal quality | The repetition number of uplink reference signal | Cell radius |
| --- | --- | --- |
| 20 dB | 1 | 100 m |
| 15 dB | 2 | 200 m |
| 10 dB | 3 | 300 m |
| 5 dB | 4 | 400 m |
| 0 dB | 5 | 500 m |
| . . . | . . . | . . . |

Referring to Table 1, it can be seen that as the signal quality decreases (i.e. a channel state becomes worse), the repetition number of the uplink reference signal increases. It can be seen that as the repetition number of the uplink reference signal increases, the cell radius also increases.

Figure 7:
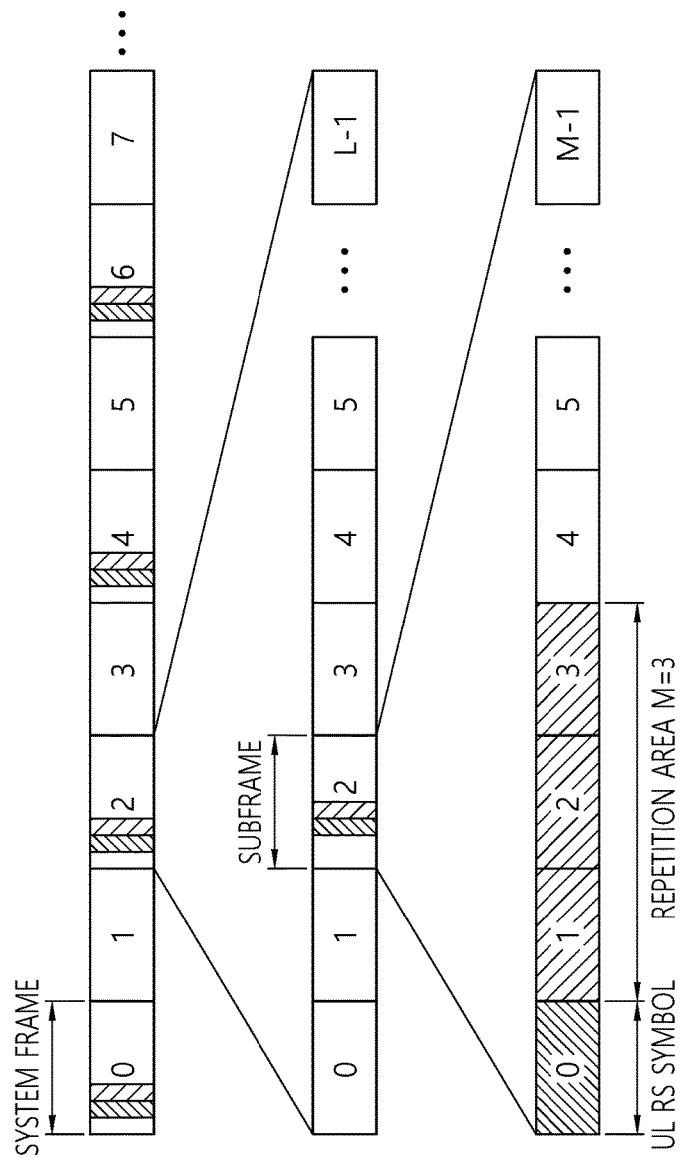
FIG. 7 illustrates an example of a repeating pattern of an uplink reference signal for obtaining a gain of 6 dB according to an embodiment of the present invention.

FIG. 7 illustrates an example of a repeating pattern of an uplink reference signal for obtaining a gain of 6 dB according to an embodiment of the present invention. Referring to FIG. 7, when an additional gain of 6 dB is required based on the RSRP, a repetition interval may correspond to three symbols. Therefore, the uplink reference signal may be repeatedly transmitted total four times including the symbol through which the uplink reference signal is transmitted in the related art.

Meanwhile, the base station may not signal the maximum repetition number N of the uplink reference signal to the UE. In this case, the UE may repeatedly transmit the uplink reference signal according to a predetermined basic repetition number. That is, when the UE fails to receive the system information through the downlink, the UE may repeatedly transmit the uplink reference signal according to a predetermined basic repetition number. In general, the basic repetition number may be set to a maximum value in consideration of the maximum coverage of the cell, but the basic repetition number may be set to a value equal to or less than the maximum repetition number.

Further, the UE may flexibly adjust the repetition number M (≤N) of the uplink reference signal using the maximum repetition number N of the uplink reference signal received from the base station and information on the signal quality obtained while detecting the downlink synchronization. When the UE acquires the downlink synchronization, the information on the signal quality may be roughly known. Accordingly, the UE may reduce the repetition number of the uplink reference signal as a distance from the base station decreases.

Figure 8:
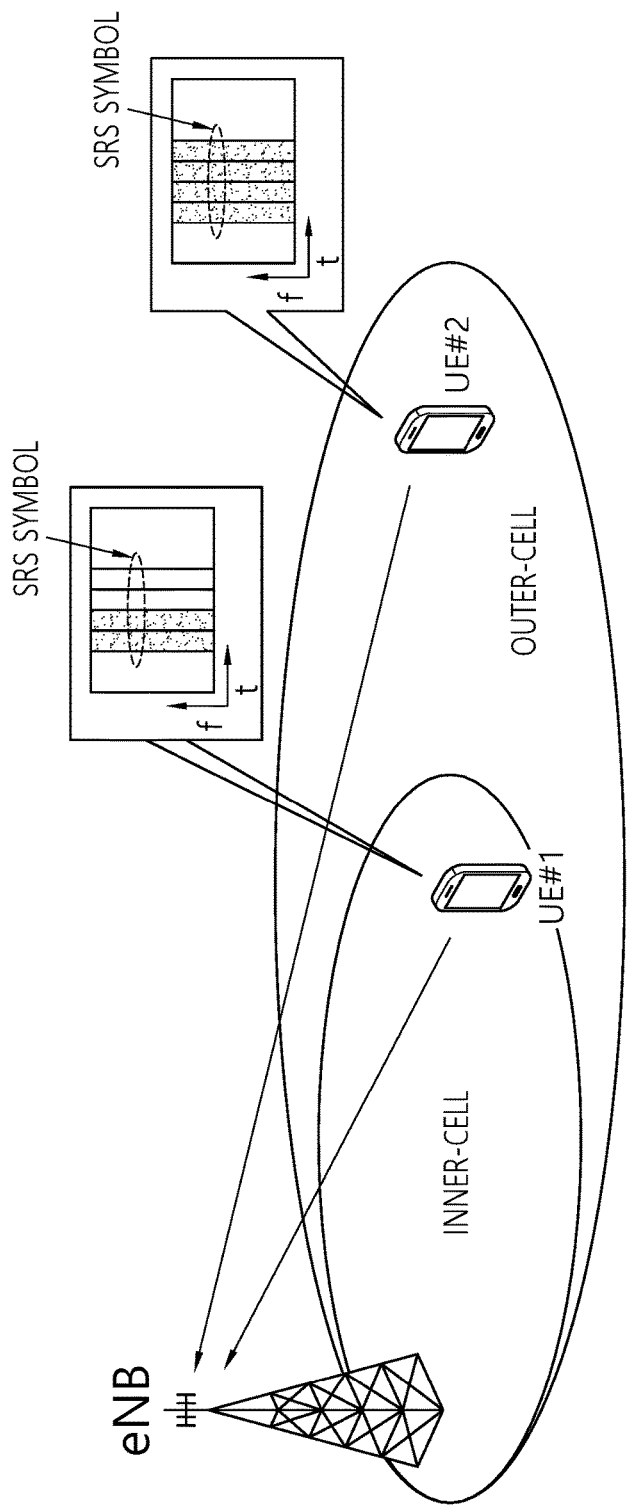
FIG. 8 illustrates another example in which each UE repeatedly transmits an uplink reference signal according to an embodiment of the present invention.

FIG. 8 illustrates another example in which each UE repeatedly transmits an uplink reference signal according to an embodiment of the present invention. Referring to FIG. 8, UE #1 is positioned in the inner-cell of the coverage of the cell provided by the base station and UE #2 is positioned in the outer-cell of the coverage of the cell provided by the base station similarly to the embodiment of FIG. 6. However, unlike the embodiment of FIG. 6, in the embodiment of FIG. 8, the repetition number of the uplink reference signal of each UE is different from each other. More specifically, UE #1 positioned in the inner-cell repeatedly transmits the uplink reference signal twice and UE #2 positioned in the outer-cell repeatedly transmits the uplink reference signal four times. That is, the repetition number of UE #1 positioned in the inner-cell that is close to the base station is smaller than the repetition number of UE #2 positioned in the outer-cell that is far from the base station.

(2) According to an embodiment of the present invention, the base station may determine the uplink coverage of each UE according to the minimum repetition number in which a signal is enabled to be detected based on the uplink reference signal received from the UE. That is, the base station may detect a location of each UE within the cell coverage based on the uplink reference signal repeatedly transmitted by the UE. The base station may group UEs based on the uplink coverage of each UE. Each UE may determine the repetition number in which the base station may stably detect a reference signal or a preamble.

Figure 9:
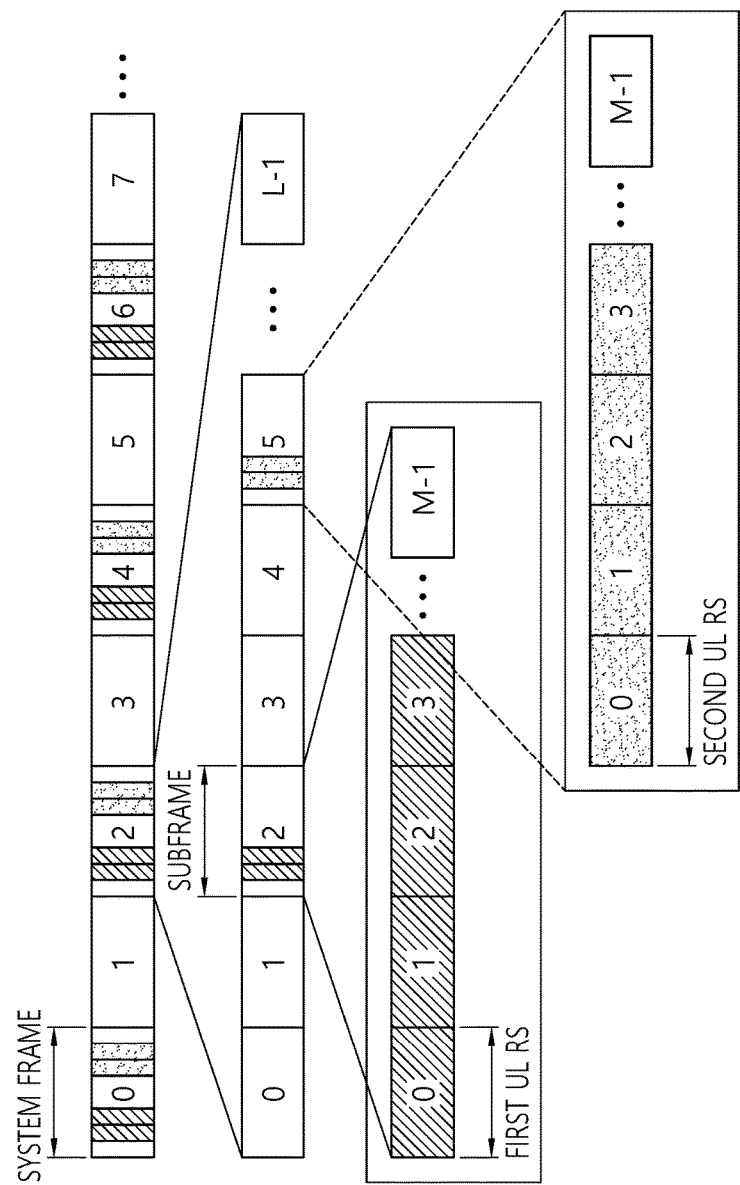
FIG. 9 illustrates an example in which two UEs repeatedly transmits an uplink reference signal according to an embodiment of the present invention.

FIG. 9 illustrates an example in which two UEs repeatedly transmits an uplink reference signal according to an embodiment of the present invention. Referring to FIG. 9, two UEs transmit the uplink reference signals through different subframes within one system frame and each uplink reference signal is repeatedly transmitted four times. More specifically, a first UE transmits a first uplink reference signal and a second UE transmits a second uplink reference signal.

Assuming that the uplink reference signal is detected in a time domain, the base station may estimate whether the corresponding uplink reference signal is normally detected as a correlation output is detected to be equal to a threshold or above the threshold in a specific symbol N according to Equation 1 given below.

$$\hat{N} = \underset{\hat{N}}{\operatorname{argmin}} \left| \sum_{j=0}^{\hat{N}-1} \sum_{i=0}^{L-1} Y[L \cdot j + i + m]S^*[i] \right|^2 > P_{Threshold} \quad \text{(Equation 1)}$$

In Equation 1, i represents a time index, m represents a timing offset, L represents a total length of a time signal (or a length of an OFDM symbol), N^ represents a total number of symbols of the uplink reference signal (N^={1, 2, 3, ..., N}), Y[i] represents the uplink reference signal received at time i, and S[i] represents the uplink reference signal transmitted at time i.

That is, the base station may detect the minimum number of symbols for which the correlation output exceeds a threshold $P_{threshold}$, for the total number N^={1, 2, 3, ..., N} of uplink reference signals transmitted by the UE. In the case of the minimum number of detected symbols or more, the additional gain is further obtained and the uplink reference signal is thus naturally detected, and as a result, the minimum number of detected symbols may be a reference for dividing an area of the uplink coverage.

Figure 10:
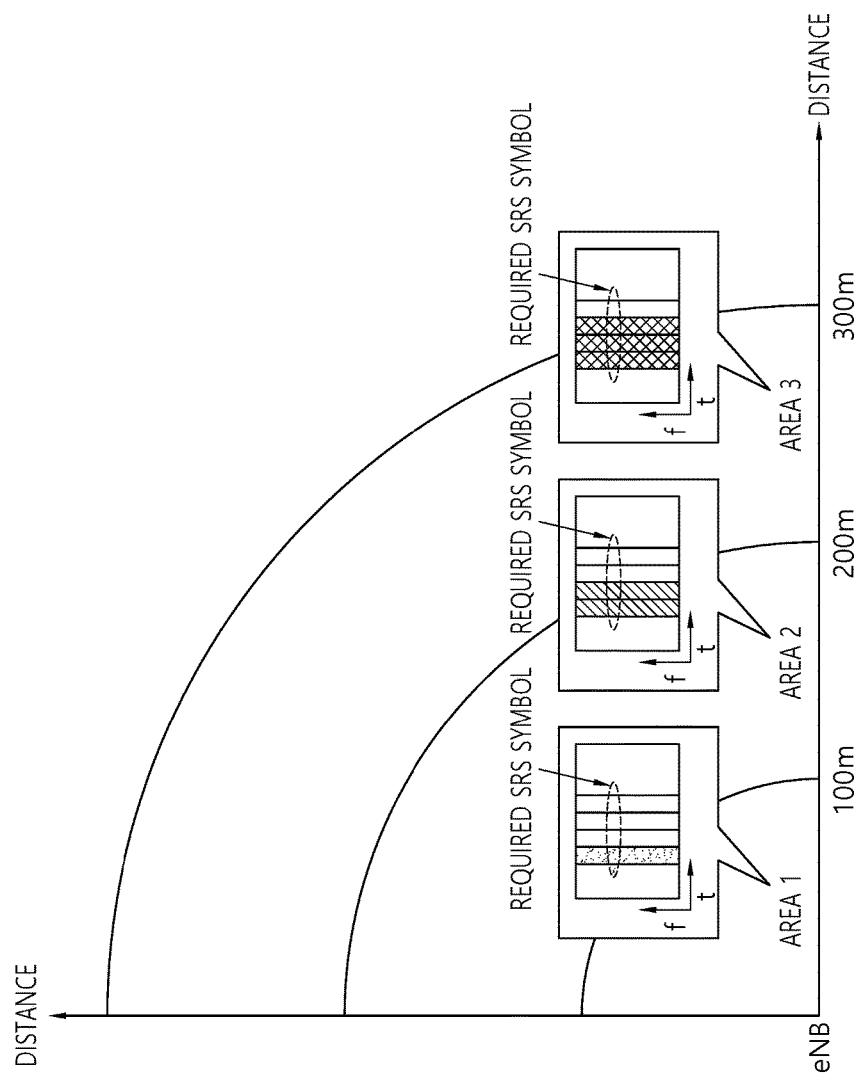
FIG. 10 illustrates an example of division of uplink coverage according to a minimum repetition number for detecting an uplink reference signal according to an embodiment of the present invention.

FIG. 10 illustrates an example of division of uplink coverage according to a minimum repetition number for detecting an uplink reference signal according to an embodiment of the present invention. For example, assuming that N^=1, 2, and 3 are detected, it can be seen that a distance between the UE and the base station is approximately 300 m according to Table 1 described above. That is, when the UE repeatedly transmits the uplink reference signal three times at this location, the base station may stably receive the uplink reference signal and the base station may divide the uplink coverage based on the uplink reference signal. Referring to FIG. 10, the uplink coverage may be divided into area 1, area 2, and area 3 according to the distance from the base station. Area 1 is an area within a distance of 100 m from the base station and the base station may stably receive the uplink reference signal repeatedly transmitted by the UE in area 1 once. Area 2 is an area within a distance of 100 m to 200 m from the base station and the base station may stably receive the uplink reference signal repeatedly transmitted by the UE in area 2 twice. Area 3 is an area within a distance of 200 m to 300 m from the base station and the base station may stably receive the uplink reference signal repeatedly transmitted by the UE in area 3 three times.

(3) As described above, the base station may determine the uplink coverage of each UE according to the minimum repetition number in which the signal is enabled to be detected based on the uplink reference signal received from the UE and group the UEs based on the uplink coverage of each UE. Additionally, according to an embodiment of the present invention, UEs which belong to the same group may transmit a beam scanning preamble through multiplexing. That is, the preambles of a plurality of UEs which belongs to the same group for beam scanning of the base station may be multiplexed in N repeated preamble symbols. As a multiplexing method, cyclic shift, an orthogonal cover code (OCC), or the like may be used.

First, each UE may repeatedly transmit the same preamble sequence in N preamble symbols. For example, each UE may repeatedly transmit a beamformed preamble sequence to which precoding is applied at an analog terminal in N preamble symbols. The preamble sequences transmitted by the plurality of UEs may be multiplexed using N orthogonal codes in N preamble symbols.

For example, assuming that four UEs simultaneously transmit the beamformed preamble sequence in four preamble symbols, an i-th sample in each preamble symbol may be expressed by Equation 2.

$$y_{1,i} = H_1 P_j^1 w_0^1 s_{1,i} + H_2 P_j^2 w_0^2 s_{2,i} + H_3 P_j^3 w_0^3 s_{3,i} + H_4 P_j^4 w_0^4 s_{4,i} + n_{1,i}$$

$$y_{2,i} = H_1 P_j^1 w_1^1 s_{1,i} + H_2 P_j^2 w_1^2 s_{2,i} + H_3 P_j^3 w_1^3 s_{3,i} + H_4 P_j^4 w_1^4 s_{4,i} + n_{2,i}$$

$$y_{3,i} = H_1 P_j^1 w_2^1 s_{1,i} + H_2 P_j^2 w_2^2 s_{2,i} + H_3 P_j^3 w_2^3 s_{3,i} + H_4 P_j^4 w_2^4 s_{4,i} + n_{3,i}$$

$$y_{4,i} = H_1 P_j^1 w_3^1 s_{1,i} + H_2 P_j^2 w_3^2 s_{2,i} + H_3 P_j^3 w_3^3 s_{3,i} + H_4 P_j^4 w_3^4 s_{4,i} + n_{4,i} \quad \text{<Equation 2>}$$

In Equation 2, $y_{n,i}$ denotes the i-th sample of an n-th OFDM symbol. That is, $y_{1,i}$ represents the i-th sample of the first OFDM symbol among four preamble symbols, $y_{2,i}$ represents the i-th sample of the second OFDM symbol among four preamble symbols, $y_{3,i}$ represents the i-th sample of the third OFDM symbol among four preamble symbols, and $y_{4,i}$ represents the i-th sample of the fourth OFDM symbol among four preamble symbols. The maximum number of samples is a fast Fourier transform (FFT) size and the total number of samples is L. $H_m$ represents an Nr*Nt channel between an m-th UE and the base station and $P_j^m$ represents a precoding vector used for j-th analog beam scanning used by the m-th UE. Further, $w_{n-1}^m$ represents a weight factor of the orthogonal code used in the n-th OFDM symbol of the m-th UE and $s_{m,i}$ represents an i-th signal of the entire sequence of the m-th UE. Last, $n_{m,i}$ represents noise of the i-th signal of the m-th UE.

Equation 3 shows an example of the orthogonal code having a length of 4 used by each UE.

$$w^1 = \{w_0^1, w_1^1, w_2^1, w_3^1\} = \{+1, +1, +1, +1\}$$

$$w^2 = \{w_0^2, w_1^2, w_2^2, w_3^2\} = \{+1, +1, -1, -1\}$$

$$w^3 = \{w_0^3, w_1^3, w_2^3, w_3^3\} = \{+1, -1, +1, -1\}$$

$$w^4 = \{w_0^4, w_1^4, w_2^4, w_3^4\} = \{+1, -1, -1, +1\} \quad \text{<Equation 3>}$$

Equation 4 shows another example of the orthogonal code having the length of 4 used by each UE. The orthogonal code used in Equation 4 is a discrete Fourier transform (DFT) code.

$$w^1 = \{w_0^1, w_1^1, w_2^1, w_3^1\} = \{+1, +1, +1, +1\}$$

$$w^2 = \{w_0^2, w_1^2, w_2^2, w_3^2\} = \{+1, -i, -1, +i\}$$

$$w^3 = \{w_0^3, w_1^3, w_2^3, w_3^3\} = \{+1, -1, +i, -1\}$$

$$w^4 = \{w_0^4, w_1^4, w_2^4, w_3^4\} = \{+1, -i, -1, -i\} \quad \text{<Equation 4>}$$

The base station may detect the preamble of each UE by using Equation 5 given below.

$$m, j = \underset{m, j \in J}{\mathrm{argmax}} \left| \sum_{i=0}^{L-1} \sum_{n=1}^{N} (w_{n-1}^m)^*(y_{n,i})^H P_j^m s_i^m \right| \quad \langle \text{Equation 5} \rangle$$

In Equation 5, J represents the entire set of analog precoding vectors. For example, there are 10 precoding vectors which each UE uses for beam scanning and J={1, 2, 3 . . . , 10}. The base station may detect the j-th precoding vector of the m-th UE, in which a beam gain is the maximum in the multiplexed beam scanning preamble using Equation 5.

Figure 11:
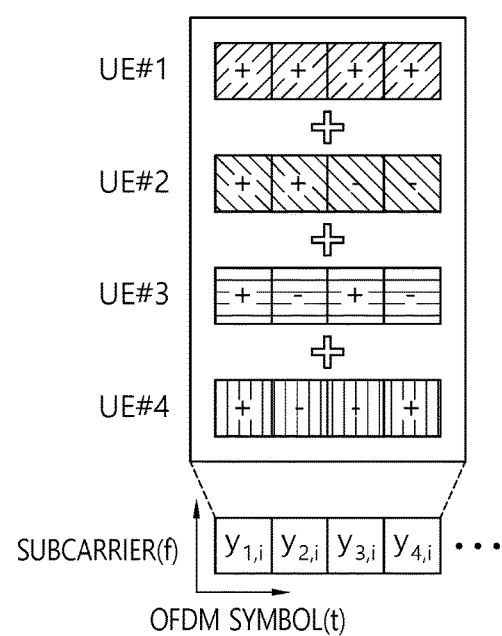
FIG. 11 illustrates an example of preamble multiplexing according to an orthogonal code for each UE according to an embodiment of the present invention.

FIG. 11 illustrates an example of preamble multiplexing according to an orthogonal code for each UE according to an embodiment of the present invention. Referring to FIG. 11, preamble sequences transmitted by four UEs in four preamble symbols are multiplexed by the orthogonal code for each UE. In this case, it is assumed that the orthogonal code for each UE follows Equation 3 described above. The base station may detect the precoding vector of the UE, in which the beam gain is the maximum in the multiplexed beam scanning preamble.

When two UEs are multiplexed, two UEs may be multiplexed using the orthogonal code having the length 2 in the same manner as in the case where the four UEs are multiplexed. A finally received signal may be expressed by Equation 6.

$$y_{1,i} = H_1 P_j^1 w_0^1 s_{1,i} + H_2 P_j^2 w_0^2 s_{2,i} + n_{1,i}$$

$$y_{2,i} = H_1 P_j^1 w_1^1 s_{1,i} + H_2 P_j^2 w_1^2 s_{2,i} + n_{2,i} \quad \text{<Equation 6>}$$

Equation 7 shows an example of the orthogonal code having the length of 2 used by each UE.

$$w^1 = \{w_0^1, w_1^1,\} = \{+1, +1\}$$

$$w^2 = \{w_0^2, w_1^2\} = \{+1, -1,\} \quad \text{<Equation 7>}$$

Figure 12:
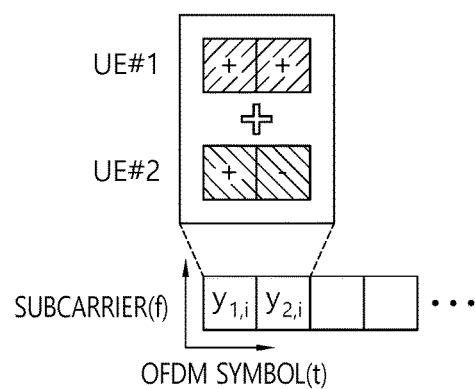
FIG. 12 illustrates another example of preamble multiplexing by an orthogonal code for each UE according to an embodiment of the present invention.

FIG. 12 illustrates another example of preamble multiplexing by an orthogonal code for each UE according to an embodiment of the present invention. Referring to FIG. 12, preamble sequences transmitted by two UEs in two preamble symbols are multiplexed by the orthogonal code for each UE. In this case, it is assumed that the orthogonal code for each UE follows Equation 7 described above. The base station may detect the precoding vector of the UE, in which the beam gain is the maximum in the multiplexed beam scanning preamble.

Further, each UE may repeatedly transmit the same preamble sequence in different preamble symbol intervals. The preamble sequences transmitted by the plurality of UEs may be multiplexed using the orthogonal codes in different preamble symbols. That is, the UEs which belong to different groups may be multiplexed by the orthogonal codes.

For example, it is assumed that a UE that repeatedly transmits the preamble twice and a UE that repeatedly transmits the preamble four times are multiplexed. The UE that transmits the preamble twice may use the orthogonal code having the length of 2 and the UE that repeatedly transmits the preamble four times may use the orthogonal code having the length of 4. For example, as shown in Equation 8 given below, the first UE and the second UE may use orthogonal codes $w^1$ and $w^2$ having the length of 2 and the third UE and the fourth UE may use orthogonal codes $w^3$ and $w^4$ having the length of 4.

$$w^1 = \{w_0^1, w_1^1, w_2^1, w_3^1\} = \{+1, +1, 0, 0\}$$

$$w^2 = \{w_0^2, w_1^2, w_2^2, w_3^2\} = \{0, 0, +1, +1\}$$

$$w^3 = \{w_0^3, w_1^3, w_2^3, w_3^3\} = \{+1, -1, +1, -1\}$$

$$w^4 = \{w_0^4, w_1^4, w_2^4, w_3^4\} = \{+1, -1, -1, +1\} \quad \text{<Equation 8>}$$

Figure 13:
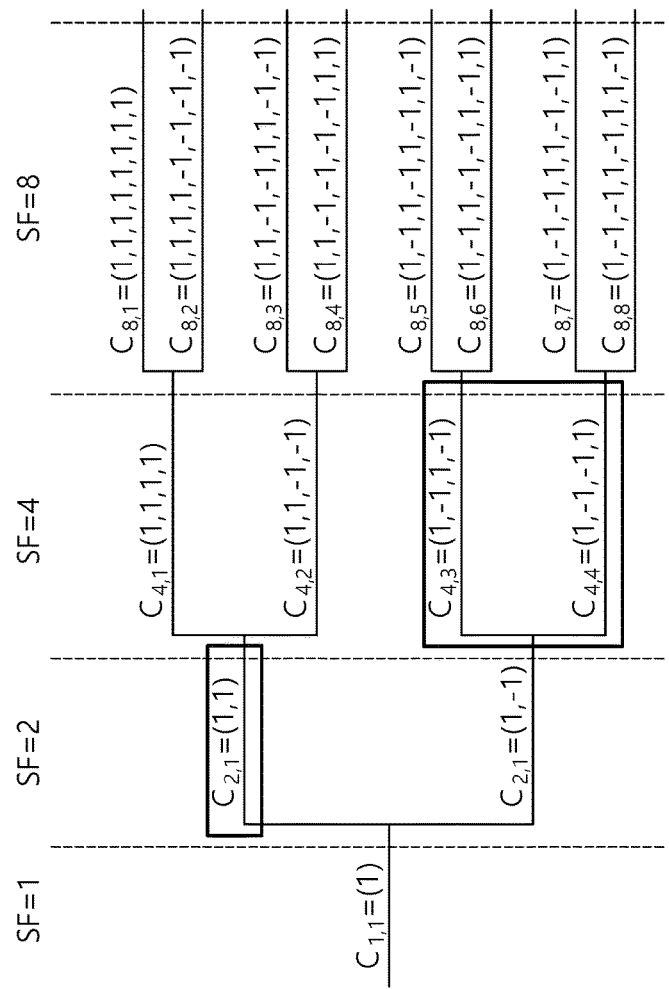
FIG. 13 illustrates an example of code selection for different preamble symbol intervals according to an embodiment of the present invention.

FIG. 13 illustrates an example of code selection for different preamble symbol intervals according to an embodiment of the present invention. Due to characteristics of the orthogonal code, the set of all orthogonal codes becomes smaller due to the UE using the orthogonal code having a small length. Referring to FIG. 13, when an orthogonal code $C_{2,1}=(1,1)$ having the length of 2 is used for the UE that repeatedly transmits the preamble twice, orthogonal codes (i.e., $C_{4,1}=(1,1,1,1)$, $C_{4,2}=(1,1,-1,-1)$, $C_{8,1}=(1,1,1,1,1,1,1,1)$, $C_{8,2}=(1,1,1,1,-1,-1,-1,-1)$) having the length of 4 below the orthogonal code $C_{2,1}=(1,1)$ may not be used. Thus, a method of using the corresponding orthogonal code with orthogonal codes of different lengths may be required.

Figure 14:
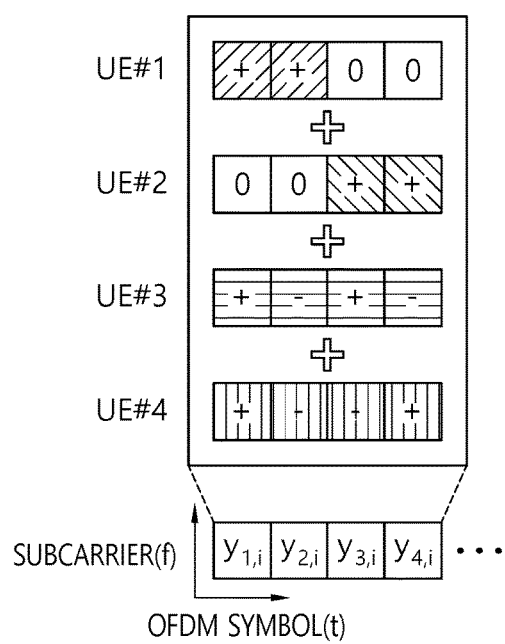
FIG. 14 illustrates an example of using an orthogonal code having a small length for transmitting preambles of different UEs according to an embodiment of the present invention.

FIG. 14 illustrates an example of using an orthogonal code having a small length for transmitting preambles of different UEs according to an embodiment of the present invention. In the embodiment of FIG. 14, the orthogonal code having the small length may be used for preamble transmission of different UEs by separating transmission points of time. Accordingly, UEs which belong to different groups may be multiplexed at one time. Referring to FIG. 14, the orthogonal codes $w^3$ and $w^4$ having the length of 4 are used as they are for the third UE and the fourth UE. An orthogonal code $w^1=\{+1, +1, 0, 0\}$ having the length of 2 is used for the precoding vector used for the j-th analog beam scanning used by the first UE (i.e., for $p_j^1$). Further, an orthogonal code $w^2=\{0, 0, +1, +1\}$ having the length of 2 is used for the precoding vector used for the j-th analog beam scanning used by the second UE (i.e., for $p_j^2$).

Figure 15:
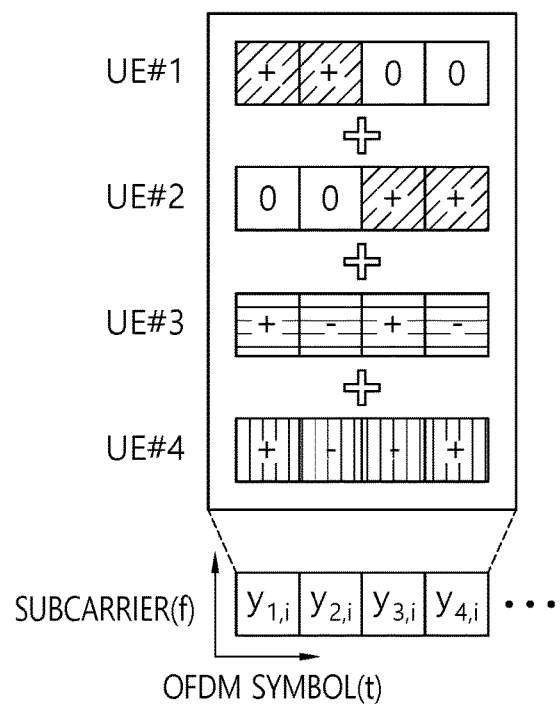
FIG. 15 illustrates another example of using an orthogonal code having a small length for transmitting preambles of different UEs according to an embodiment of the present invention.

FIG. 15 illustrates another example of using an orthogonal code having a small length for transmitting preambles of different UEs according to an embodiment of the present invention. In the embodiment of FIG. 15, the orthogonal code having the small length may be used for transmitting different preambles of the same UE by separating the transmission points of time. Accordingly, since a UE having a short preamble repetition number may transmit different beam scanning preambles at the same time point, a beam scanning period of the corresponding UE may be shortened. Referring to FIG. 15, the orthogonal codes $w^3$ and $w^4$ having the length of 4 are used as they are for the third UE and the fourth UE. The orthogonal code $w^1=\{+1, +1, 0, 0\}$ having the length of 2 is used for the precoding vector used for the j-th analog beam scanning used by the first UE (i.e., for $p_j^1$). Further, the orthogonal code $w^2=\{0, 0, +1, +1\}$ having the length of 2 is used for the precoding vector used for k-th analog beam scanning used by the second UE (i.e., for $p_k^1$).

(4) As described above, preambles of UEs which belong to the same group or different groups in a specific preamble symbol interval may be multiplexed and transmitted. Additionally, according to an embodiment of the present invention, the base station may configure a multiplexing area for beam scanning to the UE and the UE may thus transmit the beam scanning preamble using the orthogonal code thereof in an allocated multiplexing area. That is, the entire beam scanning interval may be divided into a plurality of multiplexed areas and each UE transmits the beam scanning preamble using the orthogonal code thereof in the allocated multiplexing area, and as a result, transmission start points of time of the beam scanning preambles of the plurality of UEs may be changed.

More specifically, the base station may divide and configure the entire beam scanning period into the plurality of multiplexed areas and the UE may transmit the beam scanning preamble thereof in the multiplexing area allocated to each UE according to the signaling of the base station. That is, the multiplexing area may be a unit for dividing each beam scanning period in the time domain. The number of multiplexed UEs may vary according to the group to which the UE belongs in each multiplexing area. Table 2 shows one example of a UE multiplexed in a multiplexing area configuration and each multiplexing area. In the multiplexing of the UE in each multiplexing area, the orthogonal code may be used.

TABLE 2

| Multiplexing area | The maximum number of accommodatable UEs for each multiplexing area | Multiplexable UE group | Target UE candidate |
|---|---|---|---|
| Area #0 | 2 | Group #0 | UE #0, UE #1 |
|  |  | Group #1 | UE #2, UE #3, UE #4 |
| Area #1 | 3 | Group #0 | UE #5, UE #6 |
|  |  | Group #1 | UE #7, UE #8, UE #9 |
|  |  | Group #3 | UE #10, UE #11, UE #12, UE #13 |
| . . . | . . . | . . . | . . . |

Figure 16:
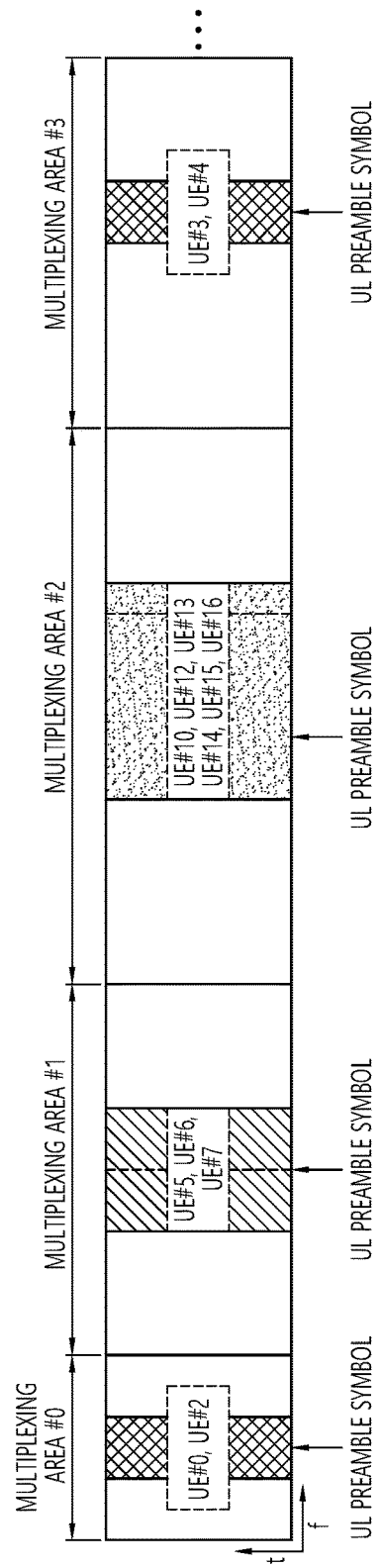
FIG. 16 illustrates an example of UE allocation through multiplexing area configuration according to an embodiment of the present invention.

FIG. 16 illustrates an example of UE allocation through multiplexing area configuration according to an embodiment of the present invention. As described above, the plurality of multiplexed areas may be configured in the time domain and multiplexing capacities of the UEs in the respective multiplexed areas may be differently determined. In this case, the base station may select and signal an uplink beam scanning target UE to be allocated to each multiplexing area. Referring to FIG. 16, multiplexing areas #0, #1, #2, and #3 may multiplex two, three, six, and two UEs, respectively, and as a result, the UE may be allocated to the multiplexing area. In this case, the preamble transmitted by the UE in each multiplexing area may be multiplexed by the method using the orthogonal code.

The base station may signal UE group information, information on the orthogonal code information, and the like to the UE according to the multiplexing area configuration. Alternatively, instead of signaling the UE group information, the information on the orthogonal code information, and the like to the UE, the base station may signal to the UE information on the uplink preamble transmission time of each UE and the number of consecutive symbols in which the uplink preamble is transmitted (implicitly indicating the length of the orthogonal code). In this case, the UE group information may be known only to the base station and the UE may just perform the beam scanning thereof through the information on the transmission time of the preamble and the number of consecutive symbols in which the preamble is transmitted.

Figure 17:
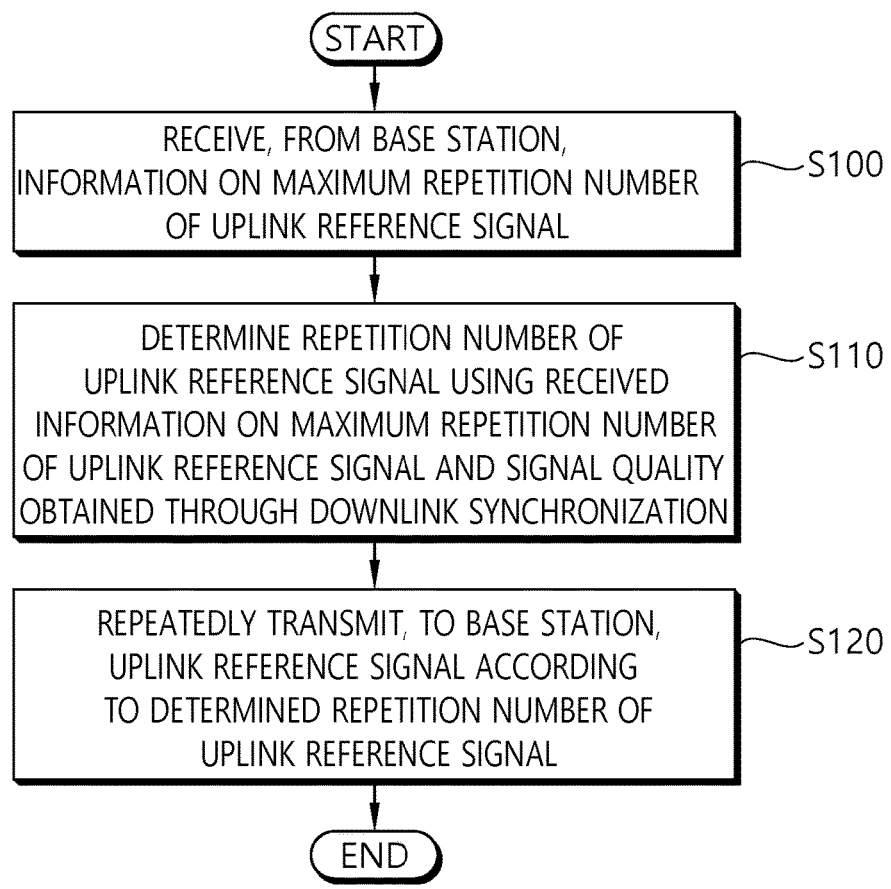
FIG. 17 illustrates a method for transmitting an uplink reference signal by a UE according to an embodiment of the present invention.

FIG. 17 illustrates a method for transmitting an uplink reference signal by a UE according to an embodiment of the present invention. The proposal of the present invention described above may be applied to the embodiment of FIG. 17.

In step S100, a UE receives from a base station information on the maximum repetition number of an uplink reference signal. The maximum repetition number of the uplink reference signal may be based on uplink service coverage of a cell. The maximum repetition number of the uplink reference signal may be transmitted through system information. The uplink reference signal may include at least one of an SRS or a demodulation reference signal (DMRS).

In step S110, the UE determines the repetition number of the uplink reference signal using information on the maximum repetition number of the received uplink reference signal and signal quality acquired through downlink synchronization. The repetition number of the uplink reference signal may decrease as a distance between the UE and the base station decreases. The repetition number of the uplink reference signal may increase as the distance between the UE and the base station increases. The signal quality may include at least one of an SNR, an RSRP, an SINR, an RSRQ, and an RSSI. That is, the UE may flexibly adjust the repetition number of the uplink reference signal using the information on the maximum repetition number of the uplink reference signal and the signal quality obtained through the downlink synchronization.

In step S120, the UE repeatedly transmits the uplink reference signal to the base station according to the determined repetition number of the uplink reference signal.

Additionally, the UE may repeatedly transmit a preamble for beam scanning to the base station using an allocated orthogonal code. In this case, each UE repeatedly transmits the same preamble sequence in N preamble symbols and preamble sequences transmitted by a plurality of UEs may be multiplexed using N orthogonal codes in N preamble symbol intervals. Alternatively, each UE repeatedly transmits the same preamble sequence in different preamble symbol intervals and the preamble sequence transmitted by the plurality of UEs may be multiplexed using different orthogonal codes in different preamble symbol intervals. That is the UEs which belong to different groups may be multiplexed by the orthogonal codes. In addition, the preamble for the beam scanning may be transmitted through a multiplexing area allocated to the UE.

Figure 18:
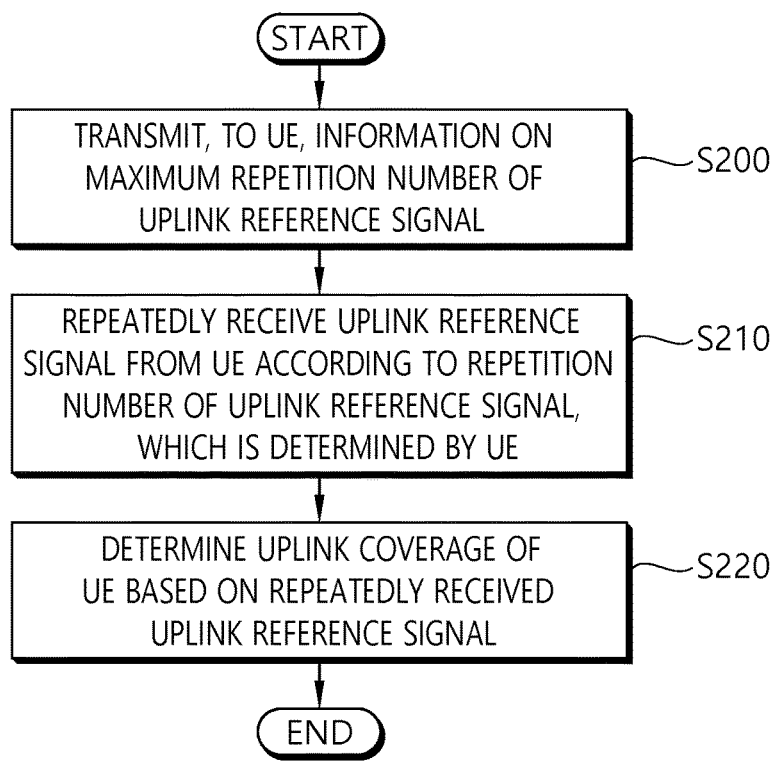
FIG. 18 illustrates a method for determining uplink coverage of a UE by a base station according to an embodiment of the present invention.

FIG. 18 illustrates a method for determining uplink coverage of a UE by a base station according to an embodiment of the present invention. The proposal of the present invention described above may be applied to the embodiment of FIG. 18.

In step S200, the base station transmits to the UE the information on the maximum repetition number of the uplink reference signal. In step S210, the base station repeatedly receives the uplink reference signal from the UE according to the determined repetition number of the uplink reference signal, which is determined by the UE. In step S220, the base station determines the uplink coverage of the UE based on the repeatedly received uplink reference signal.

The uplink coverage of the UE may be determined based on the minimum number of repeated symbols in which the repeatedly received uplink reference signal is enabled to be detected. The minimum number of repeated symbols in which the repeatedly received uplink reference signal is enabled to be detected may be determined according to whether a correlation output is detected to be equal to a threshold or above the threshold in a specific symbol. The base station may divide the uplink coverage into a plurality of areas based on the uplink coverage of the UE.

Figure 19:
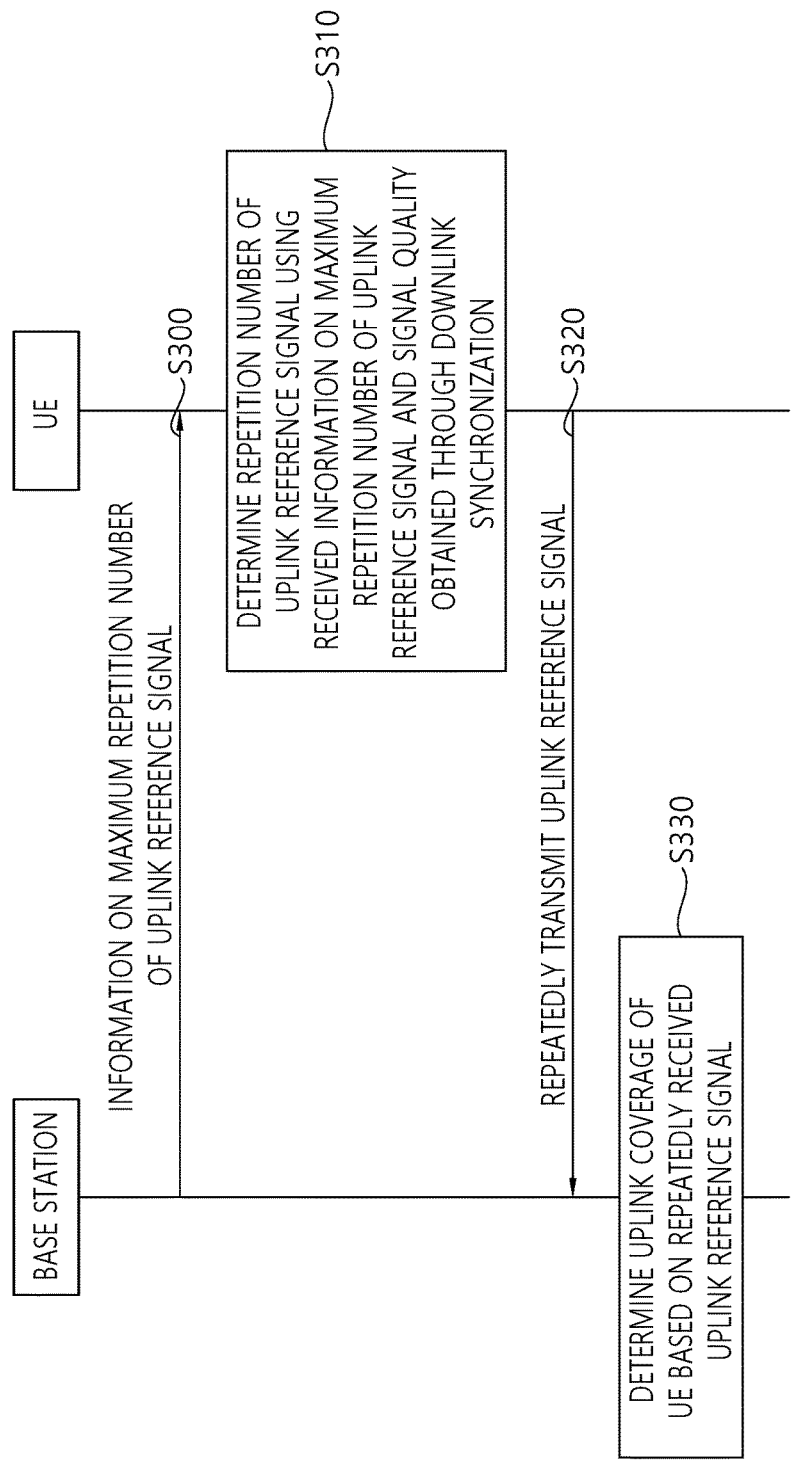
FIG. 19 illustrates a method for transmitting an uplink reference signal according to an embodiment of the present invention.

FIG. 19 illustrates a method for transmitting an uplink reference signal according to an embodiment of the present invention. The proposal of the present invention described above may be applied to the embodiment of FIG. 19.

In step S300, the base station transmits to the UE the information on the maximum repetition number of the uplink reference signal. The maximum repetition number of the uplink reference signal may be based on the uplink service coverage of the cell. The maximum repetition number of the uplink reference signal may be received through the system information.

In step S310, the UE determines the repetition number of the uplink reference signal using the information on the maximum repetition number of the received uplink reference signal and the signal quality acquired through the downlink synchronization. The repetition number of the uplink reference signal may decrease as a distance between the UE and the base station decreases. The repetition number of the uplink reference signal may increase as the distance between the UE and the base station increases. The signal quality may include at least one of the SNR, the RSRP, the SINR, the RSRQ, and the RSSI. That is, the UE may flexibly adjust the repetition number of the uplink reference signal using the information on the maximum repetition number of the uplink reference signal and the signal quality obtained through the downlink synchronization.

In step S320, the UE repeatedly transmits the uplink reference signal to the base station according to the determined repetition number of the uplink reference signal.

In step S330, the base station determines the uplink coverage of the UE based on the repeatedly received uplink reference signal. The uplink coverage of the UE may be determined based on the minimum number of repeated symbols in which the repeatedly received uplink reference signal is enabled to be detected. The minimum number of repeated symbols in which the repeatedly received uplink reference signal is enabled to be detected may be determined according to whether the correlation output is detected to be equal to the threshold or above the threshold in the specific symbol. The base station may divide the uplink coverage into the plurality of areas based on the uplink coverage of the UE.

The proposal of the present invention has been described based on the uplink transmission in which the UE transmits the signal to the base station, but the application of the present invention is not limited thereto. The present invention may be applied to any combination of a transmitter and a receiver. For example, the present invention may be applied even to downlink transmission in which the base station transmits the signal to the UE, UE-to-UE signal transmission (device-to-device (D2D), vehicle-to-vehicle (V2V), etc.), or base station-to-base station signal transmission (relay, wireless backhaul, etc.).

Figure 20:
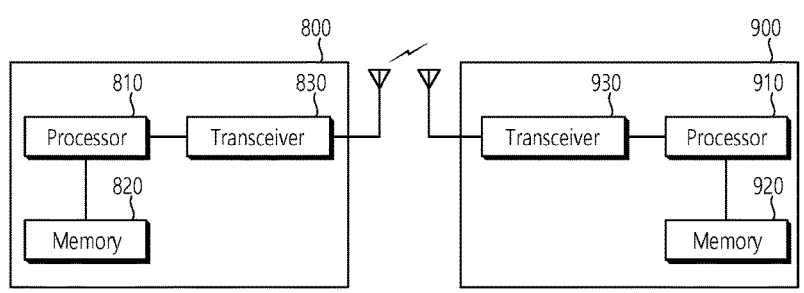
FIG. 20 shows a wireless communication system to implement an embodiment of the present invention.

FIG. 20 shows a wireless communication system to implement an embodiment of the present invention.

ABS 800 includes a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 includes a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for transmitting an uplink reference signal by a user equipment (UE) in a wireless communication system, the method comprising:
receiving, from a base station, information on a maximum repetition number of the uplink reference signal; and
transmitting, to the base station, the uplink reference signal via a plurality of orthogonal frequency division multiplexing (OFDM) symbols in a subframe,
wherein a number of the plurality of OFDM symbols is determined, by the UE, based on the information and a signal quality obtained through downlink synchronization.

2. The method of claim 1, wherein the maximum repetition number of the uplink reference signal is based on uplink service coverage of a cell.

3. The method of claim 1, wherein the maximum repetition number of the uplink reference signal is received through system information.

4. The method of claim 1, wherein the number of the plurality of OFDM symbols decreases as a distance between the UE and the base station decreases.

5. The method of claim 1, wherein the number of the plurality of OFDM symbols increases as a distance between the UE and the base station increases.

6. The method of claim 1, wherein the signal quality includes at least one of a signal to noise ratio (SNR), a reference signal received power (RSRP), a signal to interference and noise ratio (SINR), a reference signal received quality (RSRQ), or a received signal strength indication (RSSI).

7. The method of claim 1, wherein the uplink reference signal includes at least one of a sounding reference signal (SRS) or a demodulation reference signal (DMRS).

8. The method of claim 1, further comprising:
repeatedly transmitting a preamble for beam scanning to the base station by using an orthogonal code allocated to the UE.

9. The method of claim 8, wherein the preamble for the beam scanning is transmitted through a multiplexing area allocated to the UE.

10. A method for determining uplink coverage of a user equipment (UE) by a base station in a wireless communication system, the method comprising:
transmitting, to the UE, information on a maximum repetition number of an uplink reference signal;
receiving the uplink reference signal from the UE according to a repetition number of the uplink reference signal, which is determined by the UE; and
determining the uplink coverage of the UE based on the received uplink reference signal.

11. The method of claim 10, wherein the uplink coverage of the UE is determined based on a minimum number of repeated symbols in which the received uplink reference signal is enabled to be detected.

12. The method of claim 11, wherein the minimum number of repeated symbols in which the received uplink reference signal is enabled to be detected is determined according to whether a correlation output is detected to be equal to a threshold or above the threshold in a specific symbol.

13. The method of claim 12, wherein whether the correlation output is detected to be equal to the threshold or above the threshold in the specific symbol is determined according to an equation given below, $$\hat{N} = \underset{\hat{N}}{\operatorname{argmin}} \left| \sum_{j=0}^{\hat{N}-1} \sum_{i=0}^{L-1} Y[L \cdot j + i + m] S^*[i] \right|^2 > P_{Threshold}$$

where i represents a time index, m represents a timing offset, L represents a total length of a time signal (or a length of an OFDM symbol), N^ represents a total number of symbols of the uplink reference signal (N^={1,2,3, . . . , N}), Y[i] represents the uplink reference signal received at time i, and S[i] represents the uplink reference signal transmitted at time i.

14. The method of claim 13, further comprising:
calculating a timing advance (TA) based on the timing offset m and transmitting the calculated TA to the UE.

15. The method of claim 10, further comprising:
dividing the uplink coverage into a plurality of areas based on the uplink coverage of the UE.

* * * * *